United States Patent
Ruan et al.

(10) Patent No.: US 9,189,861 B2
(45) Date of Patent: Nov. 17, 2015

(54) IMAGE PROCESSING DEVICE, IMAGE PROCESSING METHOD, PROGRAM, AND RECORDING MEDIUM

(71) Applicant: OMRON Corporation, Kyoto-shi, Kyoto (JP)

(72) Inventors: Xiang Ruan, Shiga (JP); Lu Huchuan, Liaoning Province (CN); Yang Chuan, Liaoning Province (CN); Zhang Lihe, Liaoning Province (CN)

(73) Assignee: OMRON Corporation, Kyoto-shi, Kyoto (JP)

( * ) Notice: Subject to any disclaimer, the term of this patent is extended or adjusted under 35 U.S.C. 154(b) by 3 days.

(21) Appl. No.: 14/191,834

(22) Filed: Feb. 27, 2014

(65) Prior Publication Data

US 2014/0321748 A1    Oct. 30, 2014

(30) Foreign Application Priority Data

Apr. 26, 2013   (JP) .................................. 2013-094757

(51) Int. Cl.
*G06T 7/00* (2006.01)

(52) U.S. Cl.
CPC ..... *G06T 7/0081* (2013.01); *G06T 2207/20144* (2013.01)

(58) Field of Classification Search
USPC .......................................................... 382/180
See application file for complete search history.

(56) References Cited

FOREIGN PATENT DOCUMENTS

| JP | 2001-236508 A | 8/2001 |
|---|---|---|
| JP | 2010-258914 A | 11/2010 |

*Primary Examiner* — Duy M Dang
(74) *Attorney, Agent, or Firm* — Osha Liang LLP

(57) ABSTRACT

An image processing device has an affinity calculating unit that handles each pixel in an image or each region including a plurality of pixels joined together, as a unit component, and determines a first affinity between each of the unit components and one of the unit components which is located in a periphery region of the image, a foreground region identifying unit that identifies, as a foreground region, a region made up of one or more of the unit components whose first affinities calculated by the affinity calculating unit are lower than a preset threshold, and a saliency measure output unit that determines a second affinity between each of the unit components in the image and the foreground region identified by the foreground region identifying unit, and outputs the second affinity as a saliency measure for each unit component.

8 Claims, 10 Drawing Sheets

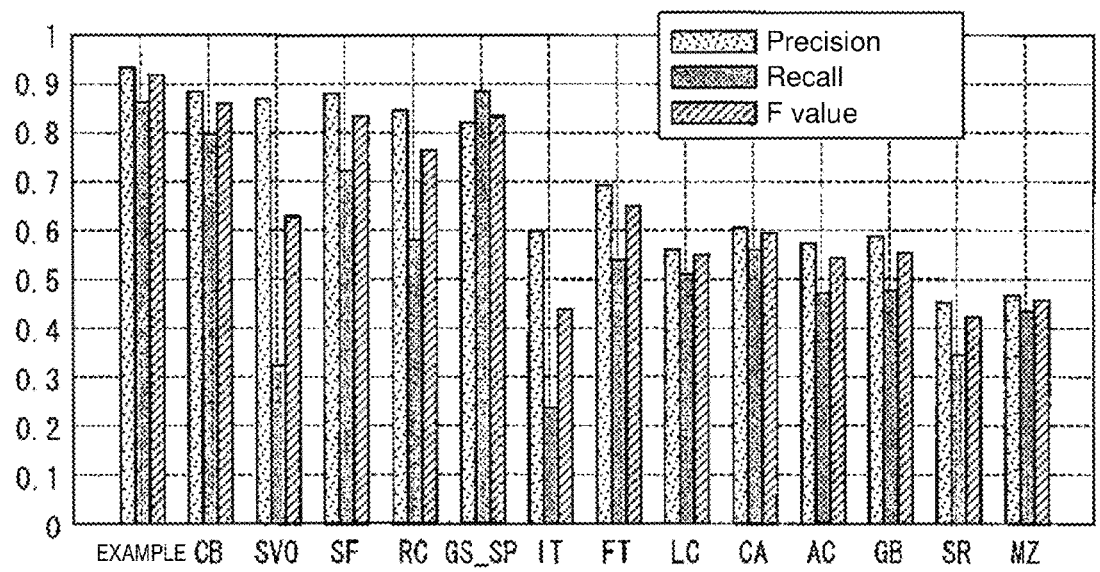

IMAGE PROCESSING DEVICE, IMAGE PROCESSING METHOD, PROGRAM, AND RECORDING MEDIUM

BACKGROUND

1. Field

The present invention relates to an image processing device and an image processing method which output a saliency measure of an image.

2. Related Art

Image processing devices, known in a conventional image processing field, detect (extract) a saliency region from an image; the saliency region is a notable image region or an image region to which people would pay attention. Such a saliency region detecting technique is also used to calculate saliency measures for pixels in an image and to create a saliency map that indicates these saliency measures.

One exemplary application of the technique above is to detect a subject from an image.

Learning-based algorithms are used to detect the saliency regions. To give an example, Japanese Unexamined Patent Publication No. 2001-236508 (disclosure date: Aug. 31, 2001) describes a technique for extracting features of various parts from target image data in which saliency measures are to be calculated. This extraction is based on feature types of the parts to be extracted which have been learned and determined in advance through learning-target image data. This technique enables saliency measures to be judged in a manner similar to a human sense by substituting the learning effect for the degree of a human's experience or memory.

Learning-based algorithms as described above are required to prepare leaning-target image data as previous knowledge for target image data. Therefore, without this previous knowledge, saliency measures cannot be evaluated.

To give another example, Japanese Unexamined Patent Publication No. 2010-258914 (disclosure date: Nov. 11, 2010) describes a technique for detecting saliency regions without the need for previous knowledge. In this technique, information between frames making up video is used.

The technique described above does not need any previous knowledge, but is intended only for moving images each made up of multiple frames. Thus, it is not applicable to evaluate saliency measures of still images.

SUMMARY

One or more embodiments of the present invention provides an image processing device and an image processing method, which are capable of evaluating accurately a saliency measure of even a single still image without the need for any previous knowledge.

According to one or more embodiments of the present invention, an image processing device includes an affinity calculating unit configured to handle each pixel in an image or each region including a plurality of pixels joined together, as a unit component, and to determine a first affinity between each of the unit components and one of the unit components which is located in a periphery region of the image. The image processing device includes a foreground region identifying unit configured to identify, as a foreground region, a region made up of one or more of the unit components whose first affinities calculated by the affinity calculating unit are lower than a preset threshold. The image processing device includes a saliency measure output unit configured to determine a second affinity between each of the unit components in the image and the foreground region identified by the foreground region identifying unit, and to output the second affinity as a saliency measure for each unit component.

According to one or more embodiments of the present invention, an image processing method includes handling each pixel in an image or each region including a plurality of pixels joined together, as a unit component, and determining a first affinity between each of the unit components and one of the unit components which is located in a periphery region of the image. The image processing method further includes: identifying, as a foreground region, a region made up of one or more of the unit components whose first affinities are lower than a preset threshold; determining a second affinity between each of the unit components in the image and the foreground region; and outputting the second affinity as a saliency measure for each unit component.

In general, a person takes a photograph such that a notable object does not protrude from the periphery (frame) of the photographed image as much as possible. For this reason, a background region is typically present on a periphery of an image. The configuration above selects one or more of unit components in an image that each have a lower affinity with one of the unit components which is located in a periphery region of the image than a determination threshold, and identifies a region made up of the selected unit component, as a foreground region. This configuration thus enables a notable object, to which people would pay attention, to be identified as a foreground region with a high probability.

Moreover, the configuration above determines a second affinity between each of the unit components in the image and the identified foreground region, as a saliency measure. Since a notable object in an image to which people would pay attention is identified as the foreground region as described above, the second affinity of each unit component with the foreground region is equivalent to the saliency measure of each unit component.

Thus, with the configuration above, an image processing device and an image processing method can be provided, which both evaluate accurately a saliency measure of even a single still image without the need for previous knowledge.

An image processing device according to one or more embodiments of the present invention includes a separation processing unit configured to split the image into a plurality of small pixel regions, each small pixel region including adjacent ones of the pixels which have mutually affinitive luminance and/or chromaticity, and to handle each small pixel region as the unit component.

The configuration above decreases the number of calculation processes for determining the first and second affinities, in comparison with a case of handling each pixel as a unit component. It is consequently possible to accelerate the calculation.

In an image processing device according to one or more embodiments of the present invention, the affinity calculating unit determines upper, lower, left and right peripheral affinities, the upper peripheral affinity being an affinity between each of the unit components and one of the unit components which is located in an upper periphery region of the image having a rectangular shape, the lower peripheral affinity being an affinity between each of the unit components and one of the unit components which is located in a lower periphery region of the image, the left peripheral affinity being an affinity between each of the unit components and one of the unit components which is located in a left periphery region of the image, the right peripheral affinity being an affinity between each of the unit components and one of the unit components which is located in a right periphery region of the image. Furthermore, according to one or more embodiments of the present invention, the affinity calculating unit determines the first affinity by multiplying together the upper, lower, left and right peripheral affinities.

Images captured by persons have various forms, and there are cases where a notable object to which people would pay attention is partially present on the periphery (frame) surrounding an image. In this case, however, a notable object is typically present on only one or some of the four peripheries (upper, lower, left and right peripheries) of an image. Therefore, an affinity between the region of the notable object and a periphery on which the notable object is not present tends to decrease. Thus, even if a notable object is partially present on the periphery (frame) surrounding an image, multiplying the four affinities to determine the first affinity enables a probability that a notable object is identified as a foreground region to be maintained considerably high.

In the image processing device according to one or more embodiments of the present invention, the affinity calculating unit determines the upper, lower, left and right peripheral affinities by using the following equation (1).

$$f^* = (D - \alpha W)^{-1} y \quad (1)$$

where f* is expressed by $[f_1^*, \ldots, f_n^*]^T$, and denotes vectors expressing the upper, lower, left and right peripheral affinities. Here, fi* denotes an affinity between an i-th unit component and the unit component located in the periphery region. In addition, n denotes the number of unit components in the image.

W denotes a matrix with an n number of rows and an n number of columns, and an element $w_{ij}$ in an i row and a j column is expressed by the following equation.

$$w_{ij} = e^{\frac{-(c_i - c_j)^2}{\sigma^2}} \quad \text{[Equation 1]}$$

where $c_i$ and $c_j$ denote feature amounts of an i-th unit component and a j-th unit component, respectively.

D denotes a diagonal matrix with an n number of rows and an n number of columns, and is expressed by D=diag $(d_{11}, \ldots, d_{nn})$. Here, $d_{ii}$ is expressed by the following equation, $$d_{ii} = \Sigma_j w_{ij} \quad \text{[Equation 2]}$$

where y is expressed by $[y_1, \ldots, y_n]^T$, $y_i$ becomes 1 when the i-th unit component is located in the periphery region of a comparison target, and becomes 0 when the i-th unit component is not located in the periphery region of the comparison target.

Moreover, α denotes a predetermined constant.

The equation (1) above is known as the manifold ranking method, and use of the equation (1) enables the affinity of a manifold to be determined accurately. Furthermore, when the four affinities, more specifically, the affinities of the upper, lower, left and right peripheral affinities are determined, $(D - \alpha W)^{-1}$ in the equation (1) can be commonly used, so that the calculation is accelerated.

In the image processing device according to one or more embodiments of the present invention, the saliency measure output unit determines the second affinity from the equation (1) by using y having an element $y_i$ that becomes 1 when the i-th unit component is located in the foreground region, and becomes 0 when the i-th unit component is not located in the foreground region.

The configuration above uses the equation (1) above to determine the second affinity. Therefore, $(D - \alpha W)^{-1}$ that has been determined in order to calculate the upper, lower, left and right peripheral affinities can be used again. This enables the calculation of the saliency map to be accelerated.

The image processing method according to one or more embodiments of the present invention may be implemented using a computer. In this case, an image processing program that enables a computer to implement the process steps of the image processing method by causing the computer to perform processing including the process steps, as well as a computer readable recording medium which stores this image processing program also fall into categories of one or more embodiments of the present invention.

One or more embodiments of the present invention provides an image processing device and an image processing method that are capable of evaluating accurately a saliency measure of even a single still image without the need for any previous knowledge.

BRIEF DESCRIPTION OF THE DRAWINGS

FIG. 10 shows precision, recall and an F value in each precision-recall curve shown in FIGS. 9A-9B when an F value becomes the maximum; and FIG. 11 shows a comparison between respective calculation speeds at which a saliency map is determined by the image processing device shown in FIG. 1 and a saliency map is determined with each conventional algorithm.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Algorithms used to detect a saliency region that exhibits a relatively high saliency measure from an image are constructed on the basis of various hypotheses. Exemplary conventional algorithms are constructed on the basis of hypotheses that a saliency region exhibits a high contrast within a local region containing the saliency region or that an image exhibits a higher saliency measure toward its center. However, the algorithm based on the former hypothesis has a problem in that the local region is difficult to identify, and the latter hypothesis does not always apply to every image. In the light of the above facts, the present inventors focused attention on a conventionally inconceivable, novel hypothesis that a background region was present on a periphery of an image, and finally reached the completion of one or more embodiments of the present invention.

(Configuration of Image Processing Device 1)

Figure 1:
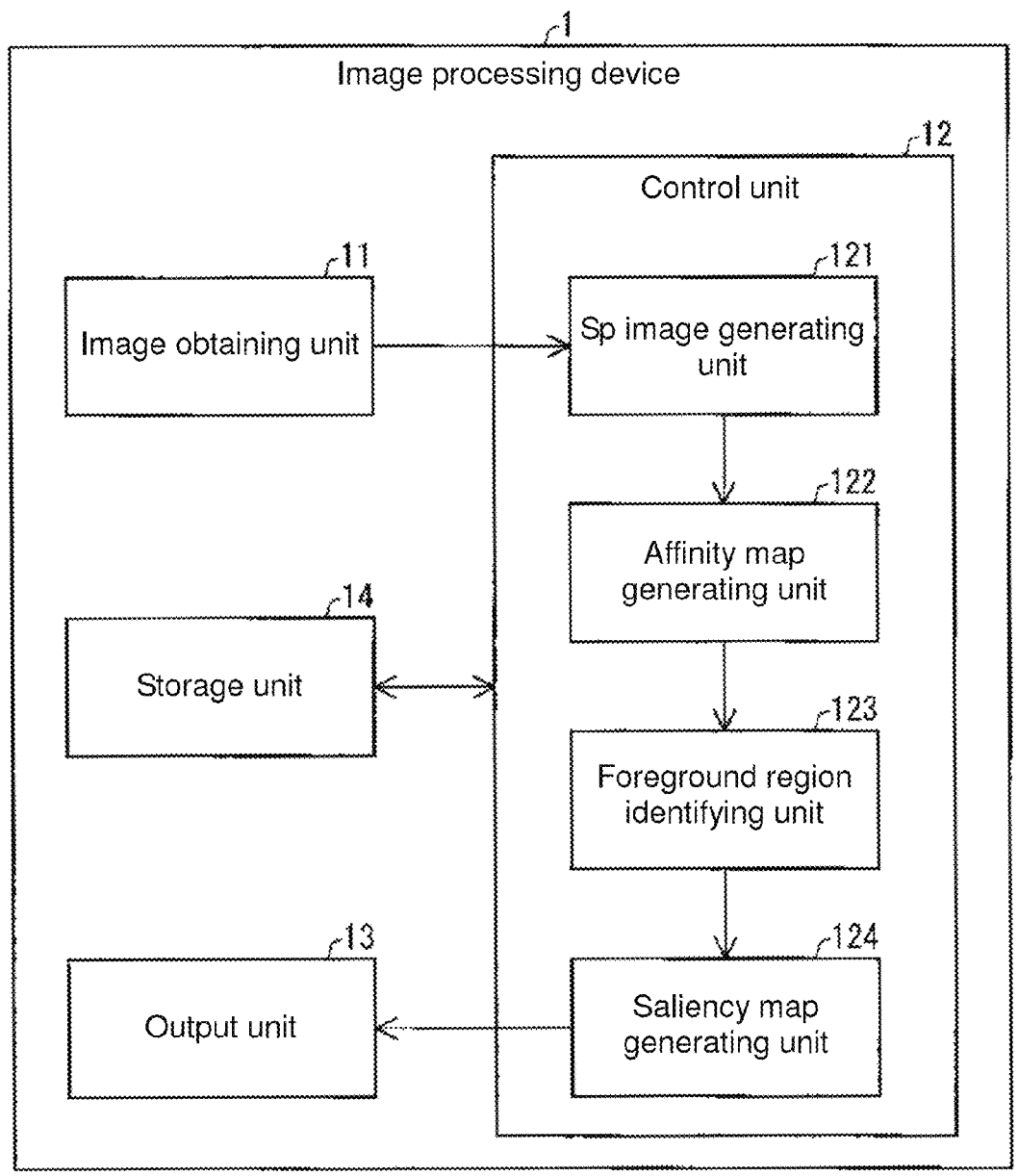
FIG. 1 shows a functional block diagram of an exemplary schematic configuration of an image processing device according to one or more embodiments of the present invention.

FIG. 1 is a functional block diagram showing a configuration of an image processing device 1 according to one or more embodiments of the present invention. The image processing device 1 shown in FIG. 1 acquires an input image, and outputs a saliency map that indicates a saliency measure for each pixel in the acquired input image. The following description will be given on the assumption that the input image is a still image; however, according to one or more embodiments of the present invention, the input image may be a moving image.

As shown in FIG. 1, the image processing device 1 includes an image obtaining unit 11, a control unit 12, an output unit 13, and a storage unit 14.

The image obtaining unit 11 acquires an input color image from the exterior. For example, in response to a user's input operation, the image obtaining unit 11 may acquire an input image from a photographic device, such a digital camera or a digital video camera, connected to the image processing device 1 in real time (in synchronism with the photographic device) or non-real time.

However, there is no specific limitation on a supply source for the input image. For example, the image obtaining unit 11 may acquire image data from the storage unit 14 as the input image. Alternatively, the image obtaining unit 11 may acquire the input image from a peripheral apparatus connected to the image processing device 1 or through a wired or wireless communication network.

The control unit 12 exercises control over various functions of the image processing device 1. The control unit 12 performs this control function by causing a processing device such as a central processing unit (CPU) to execute a control program. For example, the control unit 12 is equipped with a function and configuration for subjecting the input image received from the image obtaining unit 11 to various processes. Details of the function and configuration of the control unit 12 will be described below.

The output unit 13 externally outputs the processing result of the input image from the control unit 12. For example, the output unit 13 may output the processing result to any given image application. The output unit 13 in one or more embodiments of the present invention outputs a saliency map that the control unit 12 has generated for the input image acquired by the image obtaining unit 11.

The storage unit 14 stores various types of data and programs, and can be implemented using a combination of, for example, a read only memory (ROM), a random access memory (RAM), a nonvolatile memory (e.g., flash memory), and other storage devices.

The storage unit 14 stores, for example, programs to be executed by the control unit 12 and various types of data to be processed by the programs.

(Control Unit 12)

Next, components in the control unit 12 will be described. As shown in FIG. 1, the control unit 12 includes an SP image generating unit 121, an affinity map generating unit 122, a foreground region identifying unit 123, and a saliency map generating unit 124.

The SP image generating unit 121 receives the input image from the image obtaining unit 11 as an original image, and then generates a super-pixel image (SP image) from the original image. Here, the original image is provided with pixels as unit components; the super-pixel image is provided with super-pixels (SPs) as unit components. In short, the SP image generating unit 121 functions as a separation processing unit that splits the input image into the multiple super-pixels.

Herein, the "super-pixel" refers to a small region made up of multiple adjacent pixels which have mutually similar parameters including color and brightness. Further, an image that has super-pixels as unit components, generated from the original image, is called a super-pixel image. So, the super-pixel image is distinguished from the original image that has pixels as unit components.

By applying an image process to the super-pixel image instead of the original image, it is possible to significantly decrease the amount of data to be processed and to reduce noise of the parameters above (e.g., luminance and color).

A plurality of known algorithms are used to generate a super-pixel image. For example, a known method described in http://www2.cs.sfu.ca/~mori/research/superpixels/ may be employed. It should be noted that the total number of super-pixels within a generated super-pixel image is dependent on a parameter to be used, no matter which algorithm is employed.

When splitting the input image into an n number of super-pixels (small regions), the SP image generating unit 121 assigns numbers 1 to n to the respective super-pixels in order to distinguish them from one another.

The affinity map generating unit 122 calculates affinity maps, each of which indicates an affinity (first affinity) between each of the super-pixels, which is the unit component of the super-pixel image, and one of the super-pixels which is present on a corresponding periphery of the image. The peripheries of the image are upper, lower, left and right peripheries of the rectangle of the image. A super-pixels present on each periphery of the input image contains pixels arranged on this periphery. The affinity map generating unit 122 calculates upper, lower, left and right peripheral affinity maps, which are affinity maps for upper, lower, left and right peripheries, respectively. Specifically, the upper peripheral affinity map indicates an affinity (upper peripheral affinity) between each of the super-pixels and one of the super-pixels which is located on the upper periphery. Likewise, the lower peripheral affinity map indicates an affinity (lower peripheral affinity) between each of the super-pixels and one of the super-pixels which is located on the lower periphery. The left peripheral affinity map indicates an affinity (left peripheral affinity) between each of the super-pixels and one of the super-pixels which is located on the left periphery. The right peripheral affinity map indicates an affinity (right peripheral affinity) between each of the super-pixels and one of the super-pixels which is located on the right periphery.

There is no specific limitation on a method of calculating the affinity maps; however the affinity map generating unit 122 in one or more embodiments of the present invention employs a manifold ranking method to calculate them. The manifold ranking method is known and described in: D. Zhou, J. Weston, A. Gretton, O. Bousquet, and B. Scholkopf, "Ranking on data manifolds," Advances in Neural Information Processing Systems, vol. 16, pp. 169-176, 2004; or J. He, M. Li, H. J. Zhang, H. Tong, and C. Zhang, "Manifold-ranking based image retrieval," Proc. of ACM International Conference Multimedia, pp. 9-16, 2004. The manifold ranking method is also applicable to determine a relevance ratio in a web search.

Specifically, the affinity map generating unit 122 calculates the affinity maps on the basis of:

$$f^* = (D - \alpha W)^{-1} y. \quad (1)$$

If the SP image generating unit 121 has generated a super-pixel image made up of an n number of super-pixels, the affinity map generating unit 122 calculates an affinity map that indicates an affinity for each of the n number of super-pixels. Hereinafter, the number of super-pixels is denoted by n.

In the equation (1), W denotes an affinity matrix with an n number of rows and an n number of columns. An element $w_{ij}$ in an i row and a j column is expressed by the following equation.

$$w_{ij} = e^{\frac{-(ci - cj)^2}{\sigma^2}} \quad \text{[Equation 3]}$$

where $c_i$ and $c_j$ denote feature amounts of an i-th and j-th super-pixels, respectively, $\sigma^2$ denotes the dispersion of affinities of the feature amounts, and $w_{ij}$ denotes an affinity between an i-th and j-th super-pixels.

The feature amount may be any given parameter, such as luminance, chromaticity, and a density value of each color component configuring a color space. The feature amount ci of the i-th super-pixel may be either a representative value (e.g., average) of the respective feature amounts for the pixels that pertain to this i-th super-pixel or the set of the feature amounts. When the set of respective feature amounts for the pixels pertaining to the i-th super-pixel is used as the feature amount $c_i$ of the i-th super-pixel, respective differences (distances) in feature amount between the pixels pertaining to the i-th super-pixel and the pixels pertaining to the j-th super-pixel may be determined, and a calculation value (e.g., average) determined from these differences may be substituted in $(c_i - c_j)^2$ in the equation (2).

D is called a degree matrix, and denotes a diagonal matrix expressed by D=diag($d_{11}, \ldots, d_{nn}$). A diagonal element $d_{ii}$ is expressed by the following equation.

$$d_{ii} = \Sigma_j w_{ij} \quad \text{[Equation 4]}$$

where y denotes an indicator matrix expressed by $y=[y_1, \ldots, y_n]^T$. The element $y_i$ becomes 1 when the i-th super-pixel is located on a comparison-target periphery of a super-pixel image; the element $y_i$ becomes 0 when the i-th super-pixel is not located on the comparison-target periphery of the super-pixel image. In more detail, when the upper peripheral affinity map that indicates the affinity with the upper periphery is calculated, only the element $y_i$ that corresponds to the super-pixel located on the upper periphery is set to 1. When the lower peripheral affinity map that indicates the affinity with the lower periphery is calculated, only the element $y_i$ that corresponds to the super-pixel located on the lower periphery is set to 1. When the left peripheral affinity map that indicates the affinity with the left periphery is calculated, only the element $y_i$ that corresponds to the super-pixel located on the left periphery is set to 1. When the right peripheral affinity map that indicates the affinity with the right periphery is calculated, only the element $y_i$ that corresponds to the super-pixel located on the right periphery is set to 1.

Moreover, $\alpha$ denotes a constant (parameter or empirical value).

In the equation (1), $f^*=[f_1^*, \ldots, f_n^*]^T$, which is a vector indicating an affinity with a peripheral region. Here, $f_i^*$ denotes an affinity between the i-th super-pixel and the peripheral region.

The affinity map generating unit 122 calculates $f^*$ from the equation (1) by using y in which only $y_i$ corresponding to the super-pixel located on the upper periphery is set to 1. Then, the affinity map generating unit 122 handles the determined $f^*$ as the upper peripheral affinity map. Likewise, the affinity map generating unit 122 calculates the lower, left and right peripheral affinity maps by changing y as appropriate.

The affinity map generating unit 122 calculates an integrated affinity map by multiplying together the four affinity maps (upper, lower, left and right peripheral affinity maps) calculated in the above manner. In short, the affinity map generating unit 122 calculates an integration affinity corresponding to the i-th super-pixel by multiplying together the four affinities corresponding to the i-th super-pixel. The integrated affinity map indicates respective affinities between each of the super-pixels and all the peripheries of the image.

The foreground region identifying unit 123 identifies a foreground region by binarizing the integrated affinity map calculated by the affinity map generating unit 122. In more detail, the foreground region identifying unit 123 identifies, as a foreground region, a super-pixel region that has a lower affinity than a determination threshold. This identification is based on the hypothesis that a background region is present on a periphery of an image. Here, the determination threshold may be set either in advance or from the integrated affinity map depending on the input image. For example, the foreground region identifying unit may set the average of the affinities indicated by the integrated affinity map or the mean of the maximum and minimum of the affinities, as the determination threshold.

The saliency map generating unit 124 generates a saliency map for the input image. In more detail, the saliency map generating unit 124 generates, as the saliency map, a foreground affinity map that indicates an affinity (second affinity) between each super-pixel and the foreground region identified by the foreground region identifying unit 123. The saliency map generating unit 124 determines the foreground affinity map from the equation (1) by using $y=[y_1, \ldots, y_n]^T$ in which only $y_i$ that corresponds to the super-pixel identified as the foreground region by the foreground region identifying unit 123 is set to 1 and the other $y_i$ are set to 0. The saliency map generating unit 124 sends the foreground affinity map as the saliency map to the output unit 13.

(Flow of Saliency Map Generating Process)

Figure 2:
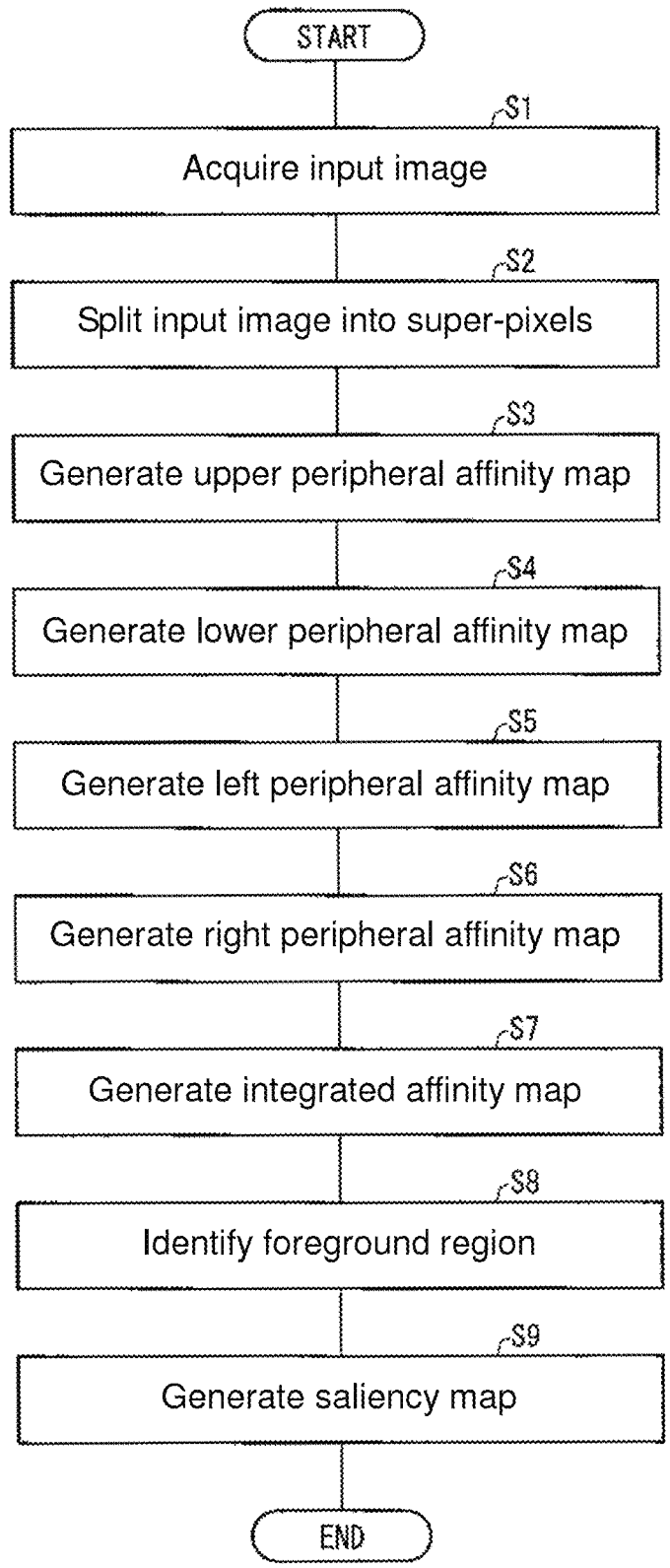
FIG. 2 shows a flowchart of a saliency map generating process performed by the image processing device shown in FIG. 1.

Next, a description will be given of the flow of a saliency map generating process performed by the control unit 12 in the image processing device 1, with reference to FIG. 2. FIG. 2 shows a flowchart of the saliency map generating process performed by the control unit 12.

Figure 3:
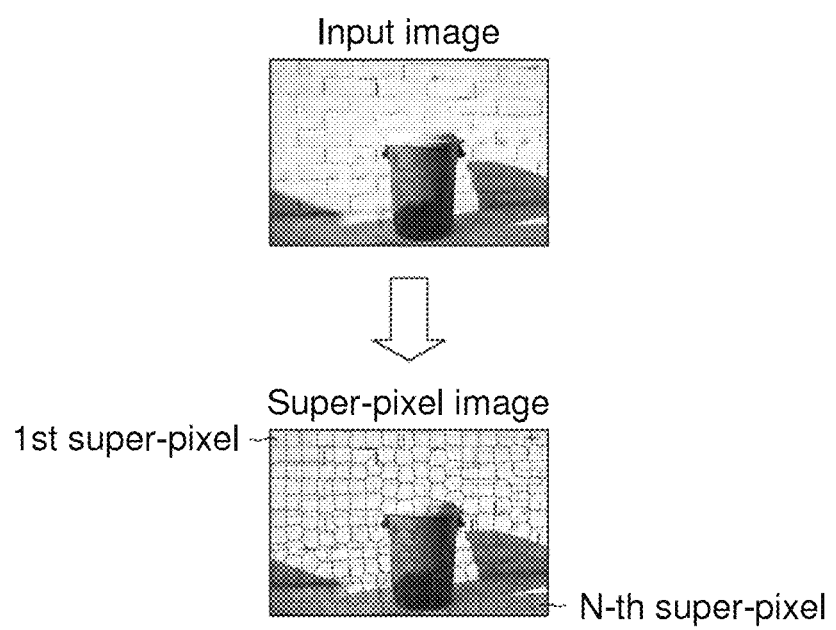
FIG. 3 shows an exemplary super-pixel image.

First, the image obtaining unit 11 acquires an input image for which a saliency map will be generated, and sends the acquired input image to the control unit 12 (S1). Then, the SP image generating unit 121 splits the input image into multiple (an n number of) super-pixels, and then generates a super-pixel image (S2). FIG. 3 shows an exemplary super-pixel image generated as a result of the process of S2. In this case, the SP image generating unit 121 assigns numbers 1 to n to the super-pixels in order to distinguish them from one another.

The affinity map generating unit 122 uses the equation (1) above to generate an upper peripheral affinity map that indicates an affinity between each of the super-pixels and one of the super-pixels which is located on the upper periphery of the image (S3). Likewise, the affinity map generating unit 122 generates lower, left and right peripheral affinity maps (S4 to S6).

Figure 4:
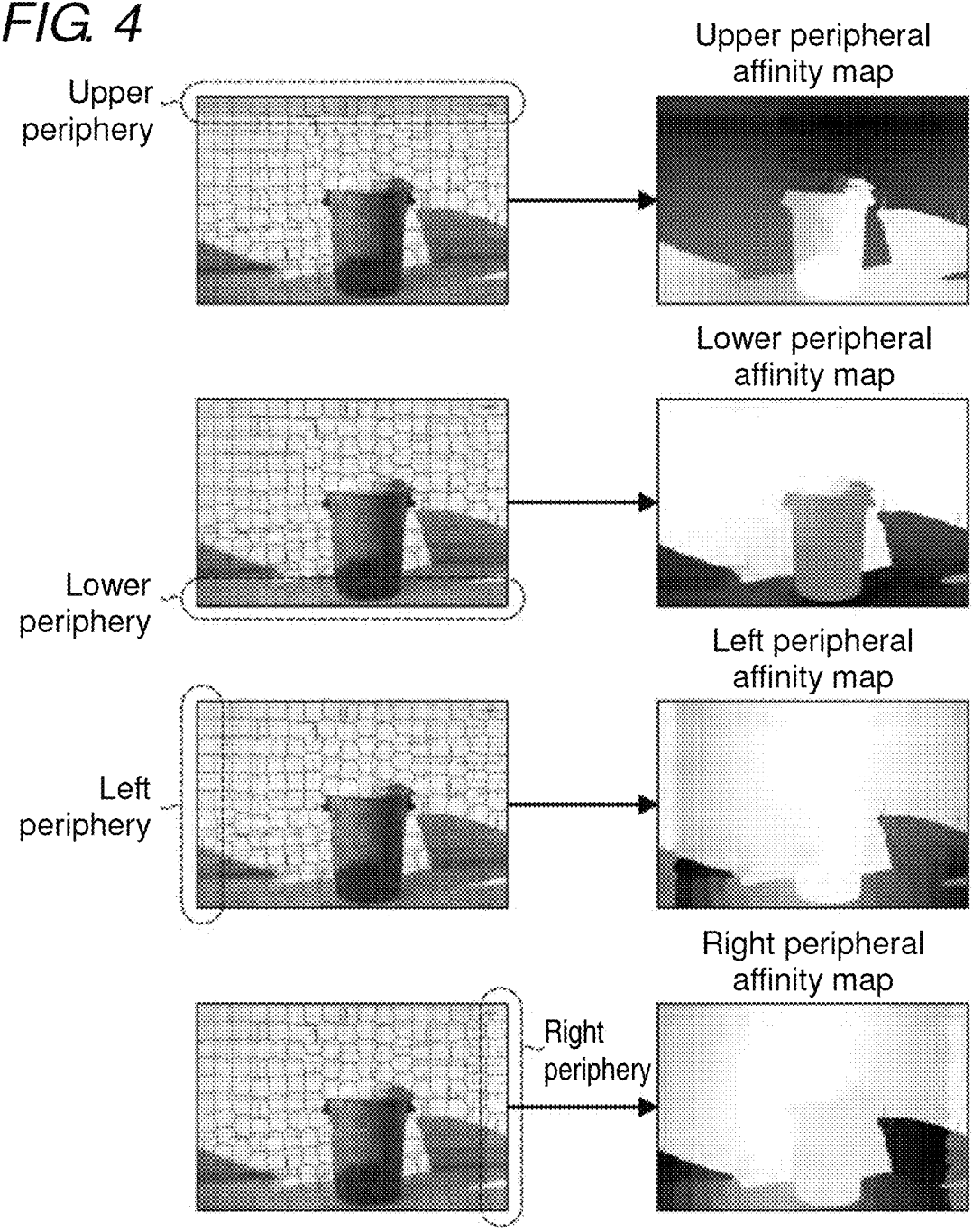
FIG. 4 shows exemplary upper, lower, left and right peripheral affinity maps generated by the affinity map generating unit in the image processing device shown in FIG. 1.

FIG. 4 shows exemplary upper, lower, left and right peripheral affinity maps generated from the super-pixel image. In each of the affinity maps in FIG. 4, each super-pixel shows a denser color (becomes more blackish) as the affinity of each super-pixel with a corresponding periphery increases. In other words, as each region becomes more blackish, the probability increases that this region is a background region, whereas as each region becomes more whitish, the probability increases that this region is a foreground region.

The affinity map generating unit 122 generates an integrated affinity map by multiplying together the four affinity maps generated in S3 to S6 (S7). Then, the foreground region identifying unit 123 applies a determination threshold to the integrated affinity map, and thereby identifies a region, the affinity of which is lower than the determination threshold, as a foreground region (S8).

Figure 5:
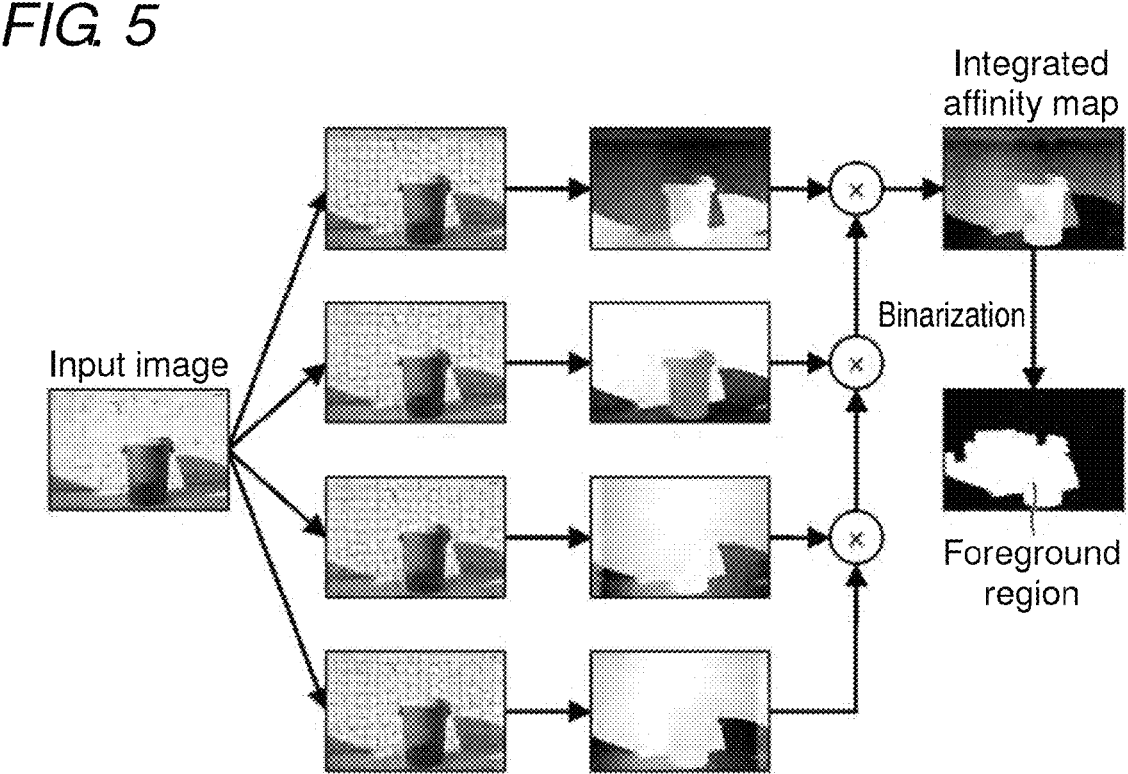
FIG. 5 shows an exemplary integrated affinity map and foreground region; the integrated affinity map being generated by the affinity map generating unit in the image processing device shown in FIG. 1, the foreground region being identified by the foreground region identifying unit in the image processing device.
Figure 6:
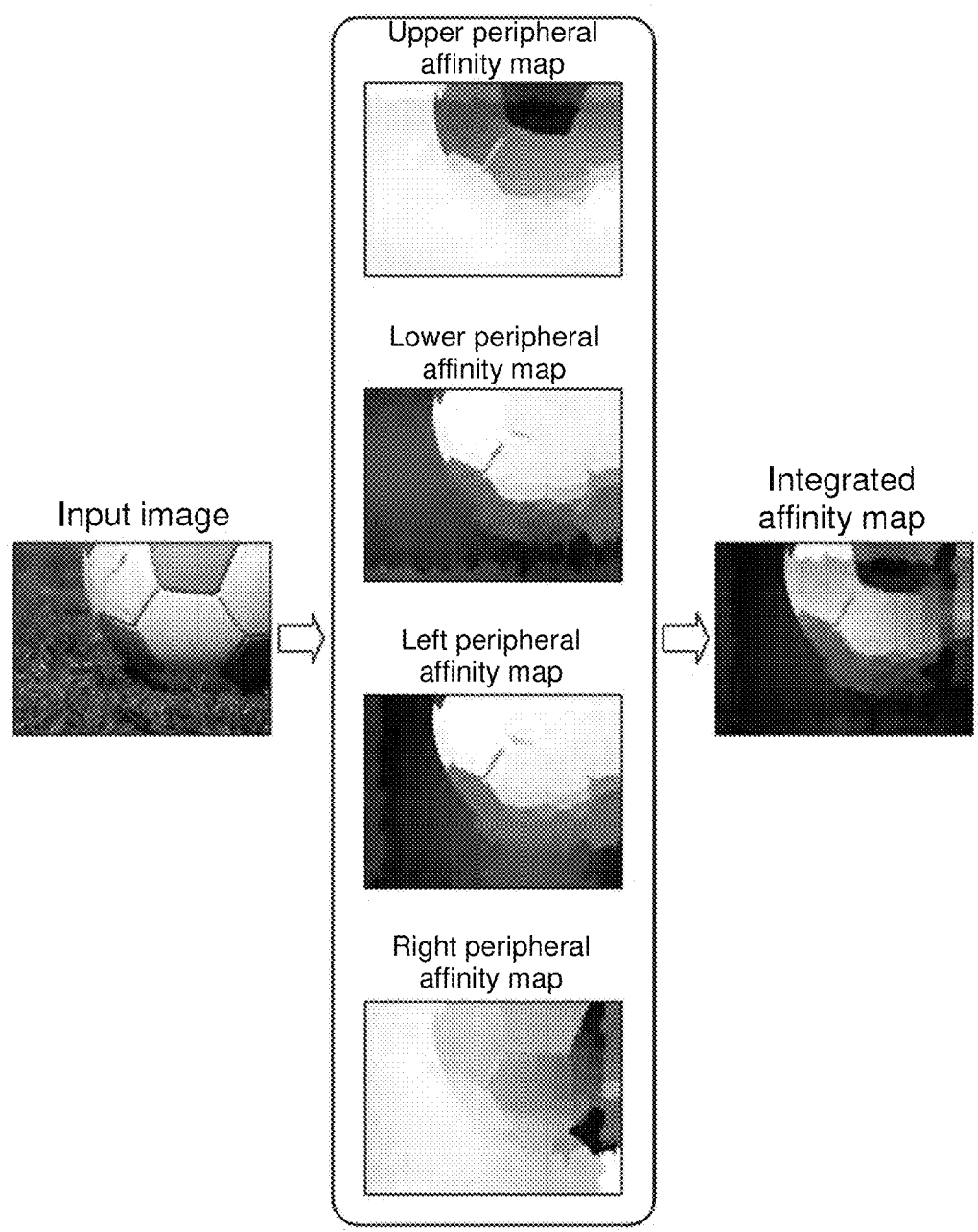
FIG. 6 shows another exemplary integrated affinity map and foreground region; the integrated affinity map being generated by the affinity map generating unit in the image processing device shown in FIG. 1, the foreground region being identified by the foreground region identifying unit in the image processing device.

FIGS. 5 and 6 show an exemplary integrated affinity map determined by the affinity map generating unit 122, and an exemplary foreground region identified by the foreground region identifying unit 123. As shown in FIGS. 5 and 6, multiplying the four affinity maps together enables the affinity with the whole periphery (whole frame) surrounding the image to be recognized. In each of the integrated affinity maps in FIGS. 5 and 6, each region exhibits a higher density (becomes more blackish) as its affinity increases, whereas each region exhibits a lower density (becomes more whitish) as its affinity decreases. Therefore, a region (the white region in FIGS. 5 and 6), the affinity of which is lower than the determination threshold, is identified as a foreground region.

Even if a notable object (soccer ball in FIG. 6) is partially located on a periphery of an input image as shown in FIG. 6, it is possible to identify this notable object as a foreground region as long as the area of the notable object which is located on the periphery is small relative to the whole area of the notable object. The reason for this is as follows. When a notable region is partially located on a comparison-target periphery of an image, the affinity increases between the comparison-target periphery and the notable region, as shown in the lower or right peripheral affinity map. In the upper and left peripheral affinity maps, however, the notable object does not have a close affinity with the comparison-target periphery. It is thus possible to identify the notable object as the foreground region by using an integrated affinity map generated by multiplying the four affinity maps together.

The saliency map generating unit 124 generates a foreground affinity map that indicates an affinity between each super-pixel and the foreground region identified in S8, from the equation (1). Then, the saliency map generating unit 124 outputs this foreground affinity map to the output unit as a saliency map (S9).

Figure 7:
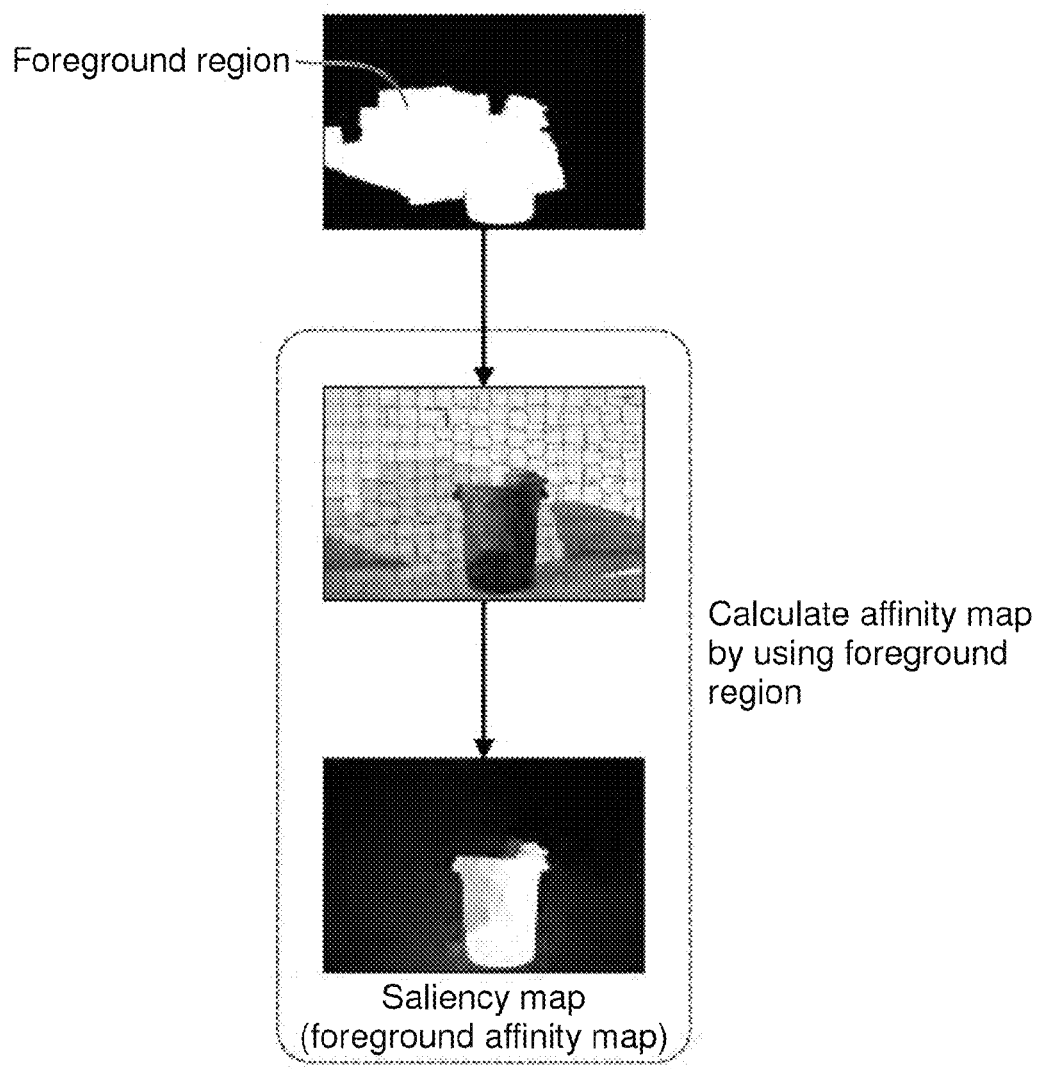
FIG. 7 shows an exemplary saliency map generated by the saliency map generating unit in the image processing device shown in FIG. 1.

FIG. 7 shows an exemplary saliency map generated by the saliency map generating unit 124. In the saliency map in FIG. 7, a region that exhibits a higher saliency measure becomes more whitish. It can be seen from FIG. 7 that an image region to which people would pay attention exhibits a higher saliency measure.

(Accuracy of Saliency Map Generated in One or More Embodiments of the Present Invention)

The algorithm with which the image processing device 1 in one or more embodiments of the present invention generates a saliency map was evaluated. Specifically, a saliency map for a certain image which was outputted from the image processing device 1 were compared with saliency maps generated with conventional algorithms.

Figure 8:
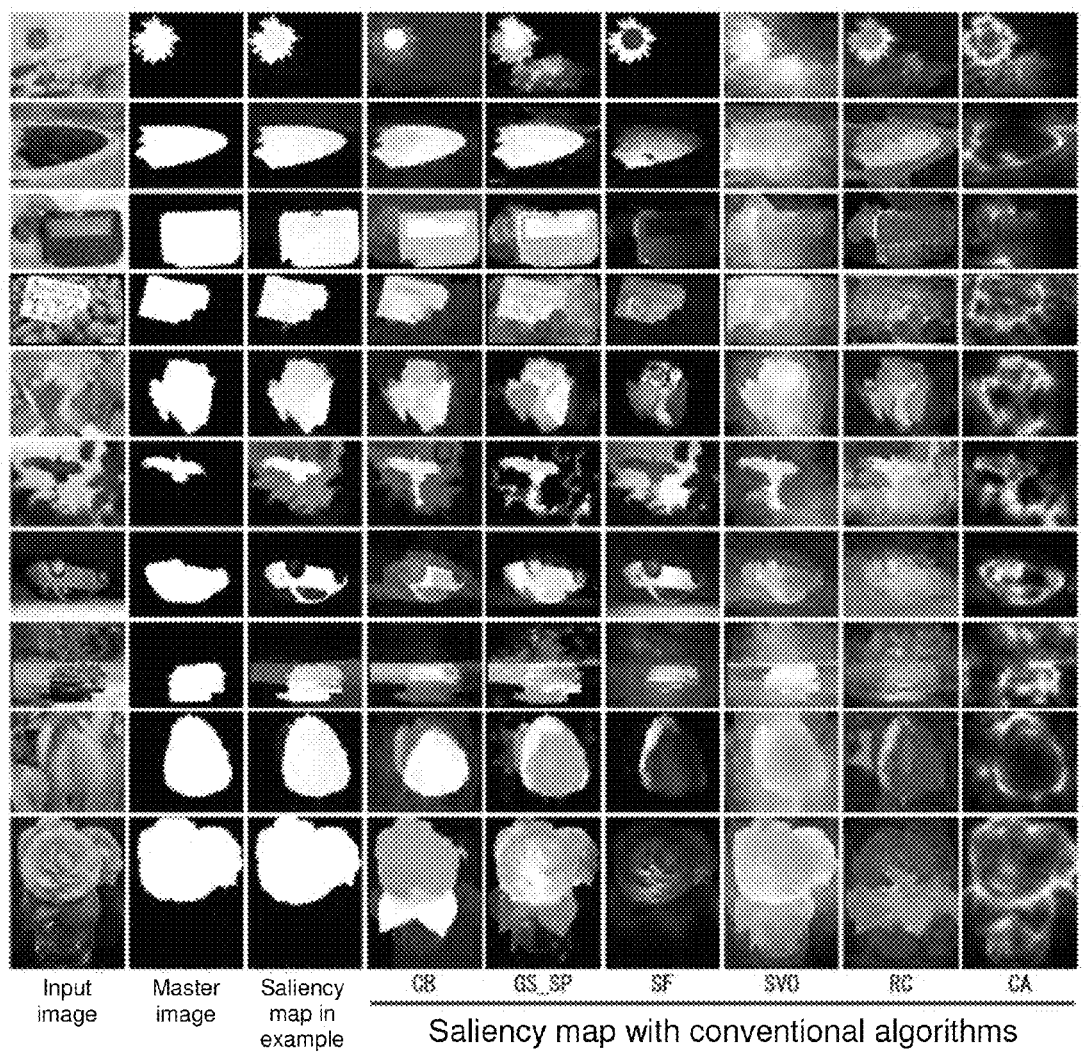
FIG. 8 shows a comparison between saliency maps generated by the image processing device shown in FIG. 1 and saliency maps generated with conventional algorithms.

FIG. 8 shows a comparison between saliency maps generated by the image processing device 1 in one or more embodiments of the present invention and saliency maps generated with conventional algorithms. In FIG. 8, input images are illustrated in the leftmost column, and master images that contain a master saliency region are illustrated in the second column from the left. Each master saliency region was determined from an average of saliency regions that multiple persons had selected from the corresponding input image. Thus, as a saliency map created with an algorithm is more similar to its master image, this algorithm is considered to be highly accurate.

In FIG. 8, saliency maps generated by the image processing device 1 are illustrated in the third column from the left; saliency maps generated by the conventional algorithms are illustrated on the right side of the third column. As is clear from FIG. 8, the saliency maps generated by the image processing device 1 in one or more embodiments of the present invention are the most similar to the corresponding master images. It is thus confirmed that the algorithm of the image processing device 1 in one or more embodiments of the present invention can be used to generate a saliency map with a high accuracy.

A precision-recall (PR) curve was calculated from a saliency map that the image processing device 1 in one or more embodiments of the present invention had outputted for a certain image. Likewise, PR curves were calculated from saliency maps that the conventional algorithms had been used to generate for a certain image. Then, these PR curves were compared to each other.

A PR curve is an index of the accuracy of an algorithm for generating a saliency map. This PR curve indicates a relationship between the precision and recall of the saliency region when different thresholds for detecting a saliency region are set for a saliency map. If a saliency map had a region, the saliency measure of which was higher than a threshold for detecting a saliency region, this region was extracted as a saliency region. In order to determine precision and recall, a master image containing a master saliency region, like one of the images illustrated in the second column from the left in FIG. 8, were prepared. In the case where an evaluation-target saliency region detected from an image was A, the master saliency region was B, and a region that the evaluation-target saliency region A and the master saliency region B overlapped each other was C, the precision and recall were denoted by C/A and C/B, respectively. In this case, the precision represented a proportion in which the master saliency region B was contained in the evaluation-target saliency region A detected from the image; the recall represented a proportion in which the evaluation-target saliency region A is contained in the master saliency region B. A saliency map generated from an input image was prepared, and a relationship between the precision and the recall was plotted when a threshold for detecting a saliency region was changed from the maximum to minimum of a saliency measure indicated by the saliency map. In this manner, the PR curve was created.

Figure 9A:
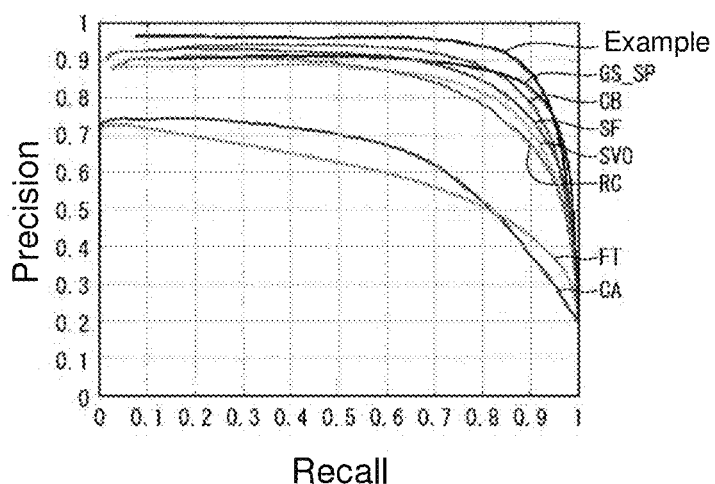
FIGS. 9A-9B show a comparison between respective precision-recall curves for a saliency map generated by the image processing device shown in FIG. 1 and a saliency map generated with each conventional algorithm.
Figure 9B:
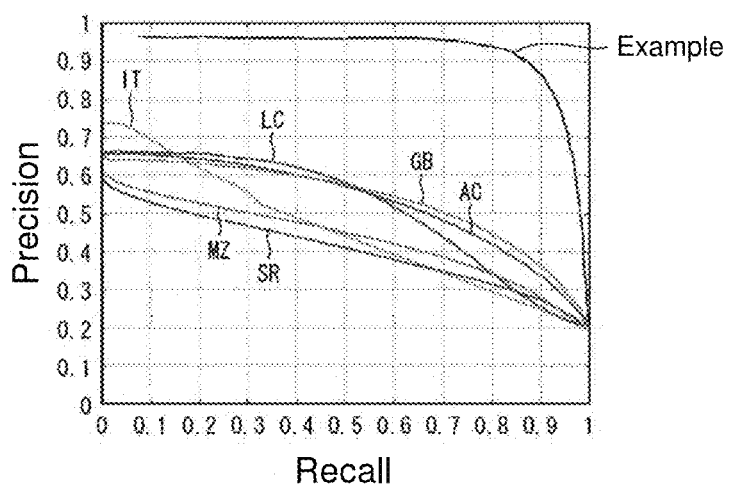

FIGS. 9A-9B shows a comparison between a PR curve (indicated by Example) that the image processing device 1 in one or more embodiments of the present invention generated for the saliency map and PR curves that the conventional algorithms were used to generate for the saliency maps. FIG. 10 shows the precision, recall and F value (=2×precision× recall/(precision+recall)) in the PR curve for each algorithm when an F value becomes the maximum.

As can be seen from the graph of the PR curves in FIGS. 9A-9B, the saliency map generated by the image processing device 1 in one or more embodiments of the present invention exhibits higher precision than those generated by the other algorithms. Also, one or more embodiments of the present invention exhibits a greater maximum F value than the other algorithms. In conclusion, it is believed that the image processing device 1 in one or more embodiments of the present invention provides a more accurate algorithm for generating a saliency map than conventionally.

It should be noted that the symbols assigned to the conventional algorithms in FIGS. 8, 9A-9B and 10 represent algorithms described in documents listed below.

[CB] H. Jiang, J. Wang, Z. Yuan, T. Liu, N. Zheng, and S. Li, "Automatic salient object segmentation based on context and shape prior," in British Machine Vision Conference, 2011, pp. 1-12.

[GS_SP] Y. C. Wei, F. Wen, W. J. Zhu, and J. Sun. Geodesic saliency using background priors.

[SF] F. Perazzi, P. Krahenbuhl, Y. Pritch, and A. Hornung. Saliency filters: Contrast based filtering for saliency region detection. In CVPR, 2012.

[SVO] K.-Y. Chang, T.-L. Liu, H.-T. Chen, and S.-H. Lai. Fusing genericobjectness and visual saliency for salient object detection. In ICCV, 2011.

[RC] Ming-Ming Cheng, Guo-Xin Zhang, Niloy J. Mitra, Xiaolei Huang, and Shi-Min Hu. "Global contrast based saliency region detection." In IEEE CVPR, pages 409-416, 2011.

[CA] S. Goferman, L. Zelnik-Manor, and A. Tal, "Context-aware saliency detection," in IEEE CVPR, 2010, pp. 2376-2383.

[FT] R. Achanta, S. Hemami, F. Estrada, and S. Susstrunk, "Frequency-tunedsaliency region detection," in IEEE CVPR, 2009, pp. 1597-1604.

[IT] L. Itti, C. Koch, and E. Niebur, "A model of saliency-based visual attention for rapid scene analysis," IEEE TPAMI, vol. 20, no. 11, pp. 1254-1259, 1998.

[LC] Y. Zhai and M. Shah, "Visual attention detection in video sequences using spatiotemporal cues," in ACM Multimedia, 2006, pp. 815-824.

[AC] R. Achanta, F. Estrada, P. Wils, and S. Susstrunk, "Salient region detection and segmentation," in IEEE ICVS, 2008, pp. 66-75.

[GB] J. Harel, C. Koch, and P. Perona, "Graph-based visual saliency," in NIPS, 2007, pp. 545-552.

[SR] X. Hou and L. Zhang, "Saliency detection: A spectral residual approach," in IEEE CVPR, 2007, pp. 1-8.

[MZ] Y. Ma and H. Zhang. Contrast-based image attention analysis by using fuzzy growing. ACM Multimedia, 2003.

(Process speed in one or more embodiments of the present invention) As described above, the image processing device 1 in one or more embodiments of the present invention calculates the five affinity maps, including upper, lower, left, right and foreground affinity maps. These affinity maps are calculated from the above equation (1) based on the manifold ranking method, as described above. In the process for calculating each affinity map, only y varies and the matrix $(D-\alpha W)^{-1}$ is a constant. Therefore, once the matrix $(D-\alpha W)^{-1}$ is determined when the upper peripheral affinity map is calculated, this matrix $(D-\alpha W)^{-1}$ can also be used for the other four peripheral affinity maps and therefore the matrix $(D-\alpha W)^{-1}$ does not need to be calculated again. This contributes to the acceleration of the calculation.

In one or more embodiments of the present invention, as described above, the SP image generating unit 121 generates the super-pixel images (SP images) from the input image, and handles the SP images as unit components in the following processing. This also contributes to the acceleration of the calculation.

The calculation speeds were compared between the algorithm used by the image processing device 1 in one or more embodiments of the present invention and the conventional algorithms. FIG. 11 shows a result of speeds at which saliency maps are calculated from a certain image. As can be seen from FIG. 11, the algorithm for the image processing device 1 in one or more embodiments of the present invention performs a calculation much faster than the conventional algorithms using the same programming language. It should be noted that in the case where the program language Matlab is used, its calculation speed is typically about four or five times as slow as a case of using the program language $C^{++}$. Hence, the acceleration of the calculation can be expected in comparison with the conventional algorithm RC.

(Modification)

In the foregoing description, the SP image generating unit 121 generates a super-pixel image, and the affinity map generating unit 122 and the saliency map generating unit 124 generate an affinity map and a saliency map, respectively, for each super-pixel in the super-pixel image. However, the image processing device 1 does not necessarily have to be provided with the SP image generating unit 121. In this case, the affinity map generating unit 122 and the saliency map generating unit 124 may generate an affinity map and a saliency map, respectively, for each pixel in an input image acquired by the image obtaining unit 11. In addition, the affinity map generating unit 122 may generate an affinity map that indicates an affinity between each pixel and a pixel located on a periphery of the input image.

CONCLUSION

As described above, the image processing device 1 in one or more embodiments of the present invention handles each pixel in an image or each super-pixel including pixels joined together, as a unit component, and includes (a) an affinity map generating unit (affinity calculating unit) 122, (b) a foreground region identifying unit 123, and (c) a saliency map generating unit (saliency measure output unit) 124. Specifically, (a) the affinity map generating unit 122 generates an affinity map that indicates an affinity between each of the unit components and one of the unit component which is located in a periphery region of an image. (b) The foreground region identifying unit 123 selects one or more of the unit components in the affinity map calculated by the affinity map generating unit 122 which have lower affinities than a preset threshold, and identifies a region made up of the selected unit components as a foreground region. (c) The saliency map generating unit 124 determines a foreground affinity map that indicates an affinity between each unit component and the foreground region identified by the foreground region identifying unit 123, and then outputs the foreground affinity map as a saliency map.

With the foregoing configuration, one or more of the unit components are selected whose affinities with a unit component located on a periphery region of the image are lower than the preset threshold, and a region made up of the selected unit components is identified as a foreground region. Therefore, there is a great probability that a notable object to which people would pay attention is identified as the foreground region.

The affinity between each unit component in the image and the identified foreground region is determined to be a saliency measure. Since a notable object in an image to which people would pay attention is identified as the foreground region, the affinity of each unit component with the foreground region is equivalent to the saliency measure of each unit component.

In conclusion, it is possible to provide an image processing device and an image processing method that are capable of evaluating accurately a saliency measure of even a single still image without the need for any previous knowledge.

[Exemplary Implementation Using Software]

Each block constituting the image processing device 1 may be implemented using either hardware including a logic circuit incorporated in an integrated circuit (IC chip) or software executable by a central processing unit (CPU).

If the latter case is employed, the image processing device 1 includes: a CPU that executes program commands for fulfilling various functions; a read only memory (ROM) that stores programs; a random access memory (RAM) that expands the programs; a storage device (recording medium), such as a memory, that stores the programs and various types of data; and the like. One or more embodiments of the present invention comprises: preparing a recording medium that stores program codes of control programs (execute-formed, intermediate code and source programs) for the image processing device 1 in a computer-readable manner, the control programs being software for fulfilling the functions above; supplying the recording medium to the image processing device 1; and causing the computer (CPU or MPU) to read and execute the program codes stored in the recording medium.

The recording medium above may be a non-transitory tangible medium. Examples of such a non-transitory tangible medium includes: a tape material such as a magnetic or cassette tape; a magnetic disk such as a Floppy™ or hard disk; a disc material including an optical disc such as CD-ROM, MO, MD, DVD or CD-R; a card material such as an IC card (including a memory card) or an optical card; a semiconductor memory material such as a mask ROM, an EPROM, an EEPROM™ or a flash ROM; and a logic circuit material such as a programmable logic device (PLD) or a field programmable gate array (FPGA).

The image processing device 1 may be configured to be connectable to a communication network, and be supplied with the program codes through the communication network. This communication network is not limited to a specific one, and may be any network that enables program codes to be transmitted. For example, an Internet, an intranet, an extranet, a LAN, an ISDN, a VAN, a CATV communication network, a virtual private network, a telephone line network, a mobile communication network, and a satellite communication network can be used. A transmission scheme configuring the communication network is limited to a specific configuration or type, and may be any scheme that enables program codes to be transmitted. The wired transmission scheme may include IEEE 1394, and use a USB cable, a power line, a cable TV line, a telephone line, an asymmetric digital subscriber Line (ADSL), or the like. The wireless transmission scheme may be infrared transmission scheme such as IrDA or any given protocol used for a remote controller, or radio transmission scheme such as Bluetooth™, IEEE 802.11, a high data rate (HDR), a near field communication (NFC), or a digital living network alliance (DLNA). In addition, the wireless transmission scheme may use a portable phone network, a satellite line, or a digital terrestrial television network. One or more embodiments of the present invention may be implemented using a computer data signal that is embodied through the electrical transmission of the program codes and is embedded in a carrier.

The present invention is not limited to the above embodiments, and various modifications are possible within the scopes of the claims. Embodiments made by combining technical ideas disclosed in the embodiments as appropriate also fall within the technical scope of the present invention.

One or more embodiments of the present invention is applicable to, for example, an image processing device that detects a saliency region from an image.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An image processing device comprising:
an affinity calculating unit that handles each pixel in an image or each region including a plurality of pixels joined together, as a unit component, and determines a first affinity between each of the unit components and one of the unit components which is located in a periphery region of the image;
a foreground region identifying unit that identifies, as a foreground region, a region made up of one or more of the unit components whose first affinities calculated by the affinity calculating unit are lower than a preset threshold; and
a saliency measure output unit that determines a second affinity between each of the unit components in the image and the foreground region identified by the foreground region identifying unit, and outputs the second affinity as a saliency measure for each unit component.

2. The image processing device according to claim 1, further comprising:
a separation processing unit that splits the image into a plurality of small pixel regions,
wherein each small pixel region includes adjacent ones of the pixels which have mutually affinitive luminance or chromaticity, and
wherein the separation processing unit handles each small pixel region as the unit component.

3. The image processing device according to claim 2,
wherein the affinity calculating unit determines upper, lower, left and right peripheral affinities,
wherein the upper peripheral affinity is an affinity between each of the unit components and one of the unit components which is located in an upper periphery region of the image having a rectangular shape,
wherein the lower peripheral affinity is an affinity between each of the unit components and one of the unit components which is located in a lower periphery region of the image,
wherein the left peripheral affinity is an affinity between each of the unit components and one of the unit components which is located in a left periphery region of the image,
wherein the right peripheral affinity is an affinity between each of the unit components and one of the unit components which is located in a right periphery region of the image, and wherein the affinity calculating unit determines the first affinity by multiplying together the upper, lower, left and right peripheral affinities.

4. The image processing device according to claim 1,
wherein the affinity calculating unit determines upper, lower, left and right peripheral affinities,
wherein the upper peripheral affinity is an affinity between each of the unit components and one of the unit components which is located in an upper periphery region of the image having a rectangular shape,
wherein the lower peripheral affinity is an affinity between each of the unit components and one of the unit components which is located in a lower periphery region of the image,
wherein the left peripheral affinity is an affinity between each of the unit components and one of the unit components which is located in a left periphery region of the image,
wherein the right peripheral affinity is an affinity between each of the unit components and one of the unit components which is located in a right periphery region of the image, and
wherein the affinity calculating unit determines the first affinity by multiplying together the upper, lower, left and right peripheral affinities.

5. The image processing device according to claim 4,
wherein the affinity calculating unit determines the upper, lower, left and right peripheral affinities by using a first equation: $f^* = (D - \alpha W)^{-1} y$, where $D \neq \alpha W$, wherein $f^*$ is expressed by $[f_1^*, \ldots, f_n^*]^T$, and denotes vectors expressing the upper, lower, left and right peripheral affinities, $fi^*$ denotes an affinity between an i-th unit component and the unit component located in the periphery region, n denotes the number of unit components in the image, W denotes a matrix with an n number of rows and an n number of columns,
wherein an element $w_{ij}$ in an i row and a j column is expressed by a second equation:

$$w_{ij} = e^{\frac{-(ci - cj)^2}{\sigma^2}},$$

wherein $\sigma \neq 0$,
wherein $c_i$ and $c_j$ denote feature amounts of an i-th unit component and a j-th unit component, respectively, D denotes a diagonal matrix with an n number of rows and an n number of columns and is expressed by $D = \text{diag}(d_{11}, \ldots, d_{nn})$,
wherein $d_{ii}$ is expressed by a third equation, $$d_{ii} = \Sigma_j w_{ij}, \text{ and}$$

wherein y is expressed by $[y_1, \ldots, y_n]^T$, $y_i$ becomes 1 when the i-th unit component is located in the periphery region of a comparison target, and becomes 0 when the i-th unit component is not located in the periphery region of the comparison target, and $\alpha$ denotes a predetermined constant.

6. The image processing device according to claim 5,
wherein the saliency measure output unit determines the second affinity from the first equation by using y having an element $y_i$ that becomes 1 when the i-th unit component is located in the foreground region, and becomes 0 when the i-th unit component is not located in the foreground region.

7. An image processing method comprising:
handling each pixel in an image or each region including a plurality of pixels joined together, as a unit component;
determining a first affinity between each of the unit components and one of the unit components which is located in a periphery region of the image;
identifying, as a foreground region, a region made up of one or more of the unit components whose first affinities are lower than a preset threshold;
determining a second affinity between each of the unit components in the image and the foreground region; and
outputting the second affinity as a saliency measure for each unit component.

8. A program stored on a non-transitory computer readable medium that executes control so as to cause a computer to perform:
handling each pixel in an image or each region including a plurality of pixels joined together, as a unit component;
determining a first affinity between each of the unit components and one of the unit components which is located in a periphery region of the image;
identifying, as a foreground region, a region made up of one or more of the unit components whose first affinities are lower than a preset threshold;
determining a second affinity between each of the unit components in the image and the foreground region; and
outputting the second affinity as a saliency measure for each unit component.

* * * * *